US012768659B2

(12) United States Patent
Yamada et al.

(10) Patent No.: US 12,768,659 B2
(45) Date of Patent: Oct. 20, 2026

(54) TRAVEL ROUTE DETERMINATION APPARATUS, TRAVEL ROUTE DETERMINATION METHOD, AND NON-TRANSITORY COMPUTER-READABLE MEDIUM

(71) Applicant: NEC Corporation, Tokyo (JP)

(72) Inventors: Shuei Yamada, Tokyo (JP); Shintaro Chiku, Tokyo (JP); Naoko Fukushi, Tokyo (JP); Masanori Kuki, Tokyo (JP); Shuhei Mizuguchi, Tokyo (JP); Kosei Kobayashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 22 days.

(21) Appl. No.: 18/851,804

(22) PCT Filed: Mar. 31, 2022

(86) PCT No.: PCT/JP2022/016635

§ 371 (c)(1),
(2) Date: Sep. 27, 2024

(87) PCT Pub. No.: WO2023/188303

PCT Pub. Date: Oct. 5, 2023

(65) Prior Publication Data

US 2025/0207924 A1 Jun. 26, 2025

(51) Int. Cl.
*G01C 21/34* (2006.01)

(52) U.S. Cl.
CPC ..... *G01C 21/3438* (2013.01); *G01C 21/3492* (2013.01)

(58) Field of Classification Search
CPC ........................ G01C 21/3438; G01C 21/3492
See application file for complete search history.

(56) References Cited

U.S. PATENT DOCUMENTS

2004/0036622 A1* 2/2004 Dukach .................. G06Q 30/02 340/988
2018/0143027 A1* 5/2018 Schlesinger ........... G06Q 50/40
(Continued)

FOREIGN PATENT DOCUMENTS

JP 2020-136756 A * 8/2020 ............... H04N 7/18
JP 2020-187432 A 11/2020
JP 2021-111109 A 8/2021

OTHER PUBLICATIONS

PR Newswire, "Nexar Launches CityStream(TM) to Provide Minute-by-Minute Visibility of Entire Cities; Innovative data solution will use smartphones and cameras in cars, allowing cities to become smarter by improving mobility and operations," PR Newswire Association LLC, May 10, 2017.*
(Continued)

*Primary Examiner* — Nathan Erb
(74) *Attorney, Agent, or Firm* — Sughrue Mion, PLLC

(57) ABSTRACT

An object of the present invention is to provide a travel route determination apparatus capable of improving a satisfaction level of a passenger of a vehicle and acquiring a video of a non-acquisition area in a monitoring area. The travel route determination apparatus includes a monitoring area video acquisition unit, an identification unit, and a determination unit. The monitoring area video acquisition unit acquires video information of the monitoring area. The identification unit identifies a non-acquisition area where the video information has not been acquired in the monitoring area. The determination unit determines a travel route of the vehicle on which the camera is mounted so that the vehicle travels in the non-acquisition area. The determination unit determines the travel route of the vehicle based on a boarding point where a passenger boards the vehicle and an alighting point where the passenger alights the vehicle.

11 Claims, 6 Drawing Sheets

(56) References Cited

U.S. PATENT DOCUMENTS

| | | | | |
|---|---|---|---|---|
| 2020/0333146 | A1* | 10/2020 | Shoval | G08G 1/202 |
| 2020/0359181 | A1* | 11/2020 | Kusumoto | H04W 4/44 |
| 2020/0372791 | A1* | 11/2020 | Li | G06V 20/597 |
| 2023/0298361 | A1* | 9/2023 | Yang | G06V 20/588<br>382/104 |

OTHER PUBLICATIONS

International Search Report for PCT Application No. PCT/JP2022/016635, mailed on Jun. 21, 2022.

* cited by examiner

TRAVEL ROUTE DETERMINATION APPARATUS, TRAVEL ROUTE DETERMINATION METHOD, AND NON-TRANSITORY COMPUTER-READABLE MEDIUM

This application is a National Stage Entry of PCT/JP2022/016635 filed on Mar. 31, 2022, the contents of all of which are incorporated herein by reference, in their entirety.

TECHNICAL FIELD

The present disclosure relates to a travel route determination apparatus, a travel route determination method, and a non-transitory computer-readable medium.

BACKGROUND ART

In crowd behavior analysis, a video of each location in a monitoring area is required. For example, a video is captured by a monitoring camera such as a fixed camera. However, congestion, a population flow, and the like cannot be analyzed in an area where a video has not been acquired (hereinafter referred to as a non-acquisition area) because a monitoring camera is not installed.

Patent Literature 1 describes a vehicle control device that changes a travel route of a vehicle to acquire a video of a non-acquisition area when a distance from a current position of the vehicle that a passenger boards to the non-acquisition area is less than a predetermined distance and there is permission from the passenger.

CITATION LIST

Patent Literature

Patent Literature 1: Japanese Unexamined Patent Application Publication No. 2020-136756

SUMMARY OF INVENTION

Technical Problem

In Patent Literature 1, the fact that the distance from the current position to the non-acquisition area is less than the predetermined distance is used as a chance to change the travel route. Therefore, there is a problem that a sudden change occurs in the travel route of the vehicle and a satisfaction level of the passenger of the vehicle decreases.

In view of such a problem, an object of the present disclosure is to provide a travel route determination apparatus, a travel route determination method, and a non-transitory computer-readable medium capable of improving a satisfaction level of a passenger of a vehicle and acquiring a video of a non-acquisition area in a monitoring area.

Solution to Problem

According to an aspect of the present disclosure, a travel route determination apparatus includes:

a monitoring area video acquisition unit configured to acquire video information of a monitoring area;

an identification unit configured to identify a non-acquisition area where the video information has not been acquired in the monitoring area; and a determination unit configured to determine a travel route of a vehicle on which a camera is mounted so that the vehicle travels in the non-acquisition area.

The determination unit determines the travel route of the vehicle based on a boarding point where a passenger boards the vehicle and an alighting point where the passenger alights the vehicle.

According to another aspect of the present disclosure, a travel route determination method includes:

acquiring, by a computer, video information of a monitoring area;

identifying, by the computer, a non-acquisition area where the video information has not been acquired in the monitoring area; and determining, by the computer, a travel route of a vehicle on which a camera is mounted so that the vehicle travels in the non-acquisition area.

The determination of the travel route of the vehicle includes determining the travel route of the vehicle based on a boarding point where a passenger boards the vehicle and an alighting point where the passenger alights the vehicle.

According to still another aspect of the present disclosure, a non-transitory computer-readable medium stores a program causing a computer to perform:

acquiring video information of a monitoring area;

identifying a non-acquisition area where the video information has not been acquired in the monitoring area; and determining a travel route of a vehicle on which a camera is mounted so that the vehicle travels in the non-acquisition area.

The determination of the travel route of the vehicle includes determining the travel route of the vehicle based on a boarding point where a passenger boards the vehicle and an alighting point where the passenger alights the vehicle.

Advantageous Effects of Invention

According to the present disclosure, it is possible to provide a travel route determination apparatus, a travel route determination method, and a non-transitory computer-readable medium capable of improving the satisfaction level of a passenger of a vehicle and acquiring a video of a non-acquisition area in a monitoring area.

EXAMPLE EMBODIMENT

Figure 1:
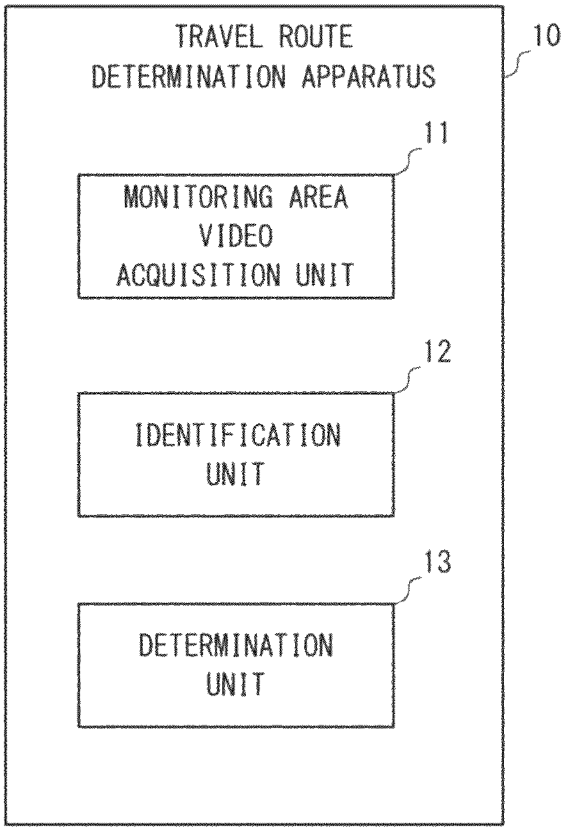
FIG. 1 is a block diagram illustrating a configuration of a travel route determination apparatus according to a first example embodiment.

Hereinafter, example embodiments of the present disclosure will be described in detail with reference to the drawings. In the drawings, the same or corresponding elements are denoted by the same reference numerals and signs, and repeated description of the elements will be omitted according to necessity for clarity of description.

First Example Embodiment

First, a configuration of a travel route determination apparatus 10 according to a first example embodiment will be described with reference to FIG. 1. The travel route determination apparatus 10 includes a monitoring area video acquisition unit 11, an identification unit 12, and a determination unit 13.

The monitoring area video acquisition unit 11 acquires video information of the monitoring area. The identification unit 12 identifies a non-acquisition area where video information has not been acquired in the monitoring area. The determination unit 13 determines a travel route of the vehicle on which the camera is mounted so that the vehicle travels in the non-acquisition area. The determination unit 13 determines the travel route of the vehicle based on the boarding point where the passenger boards the vehicle and the alighting point where the passenger alights the vehicle.

The travel route determination apparatus 10 according to the first example embodiment determines a travel route of a vehicle on which a camera is mounted so that the vehicle travels in the non-acquisition area in the monitoring area. Accordingly, the travel route determination apparatus 10 can acquire a video of the non-acquisition area in the monitoring area, for example, where no monitoring camera is installed. Therefore, the travel route determination apparatus 10 can analyze congestion, a population flow, and the like, for example, even in the non-acquisition area.

The travel route determination apparatus 10 determines the travel route of the vehicle 30 so that the vehicle travels in the non-acquisition area based on the boarding point and the alighting point of the passenger stored in advance. Accordingly, by causing the vehicle to travel along the predetermined travel route, the travel route determination apparatus 10 can prevent a decrease in the satisfaction level of the passenger of the vehicle since no sudden change occurs in the travel route of the vehicle 30.

Second Example Embodiment

Figure 2:
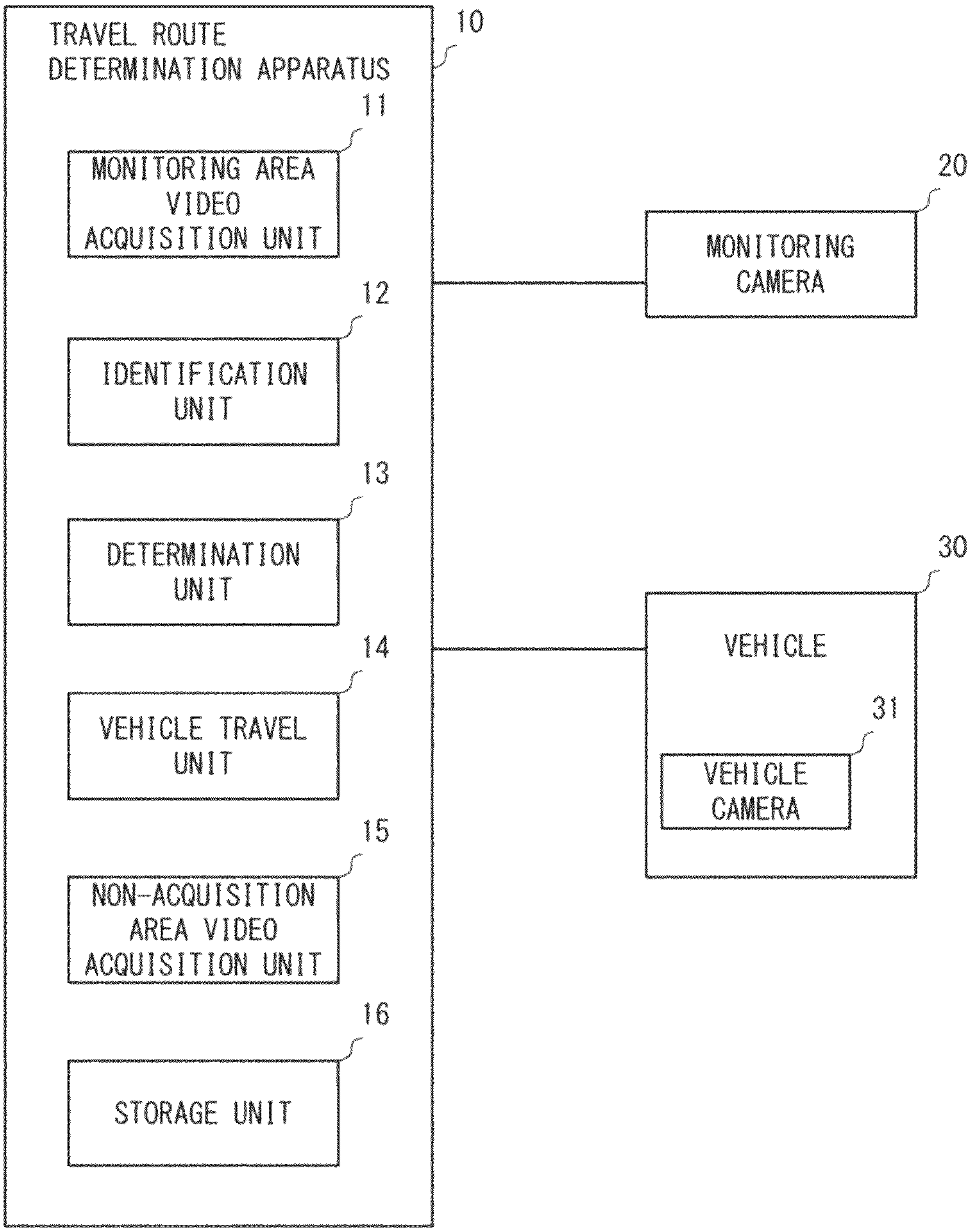
FIG. 2 is a block diagram illustrating a configuration of a travel route determination apparatus according to a second example embodiment.

Next, a configuration of a travel route determination apparatus 10 according to a second example embodiment will be described with reference to FIG. 2.

The travel route determination apparatus 10 is, for example, a server constructed on a cloud, and communicates with a monitoring camera 20 and the vehicle 30 to transmit and receive various types of information. A communication scheme is, for example, a wireless communication scheme such as a wireless LAN. The travel route determination apparatus 10 may directly communicate with the monitoring camera 20 and the vehicle 30 or may communicate with the monitoring camera 20 and the vehicle 30 via an edge such as a base station or the like installed in a traffic light.

The monitoring camera 20 is an on-road camera such as a security camera or an intersection camera installed in an area to be monitored (hereinafter referred to as a monitoring area). The monitoring camera 20 captures an image of each location in the monitoring area and transmits the captured video information to the travel route determination apparatus 10.

The vehicle 30 is, for example, an on-demand bus or the like. In the present example embodiment, a case where the vehicle 30 is an on-demand bus that can travel automatically will be described as an example. Traveling of the vehicle 30 is controlled by the travel route determination apparatus 10. The on-demand bus is a reservation type bus without a predetermined route or a timetable like a route bus. In the on-demand bus, a passenger reserves a boarding reservation time and information regarding a boarding point and an alighting point by using a smartphone application, a telephone, or the like, and travels along a travel route automatically generated according to the information. The on-demand bus may also determine a travel route for a plurality of passengers to board the on-demand bus. The use of the on-demand bus has the advantage that a passenger can move an alighting point along an optimum route since there is no specific route, and the advantage that a passenger can use the on-demand bus at the same fare as a route bus at a low cost.

A camera (hereinafter referred to as a vehicle camera 31) is mounted on the vehicle 30. The vehicle camera 31 mounted on the vehicle 30 captures an image of an area where the vehicle 30 travels, and transmits the captured video information to the travel route determination apparatus 10.

Next, a detailed configuration of the travel route determination apparatus 10 will be described. The travel route determination apparatus 10 includes a monitoring area video acquisition unit 11, an identification unit 12, a determination unit 13, a vehicle travel unit 14, a non-acquisition area video acquisition unit 15, and a storage unit 16 (also referred to as functional constituent elements). The travel route determination apparatus 10 may be implemented by a single device or may be implemented as a system by a plurality of devices.

The monitoring area video acquisition unit 11 acquires video information in the monitoring area from the monitoring camera 20. The video information in the monitoring area includes video information of each location in the monitoring area. Then, the monitoring area video acquisition unit 11 stores the video information in the monitoring area in the storage unit 16.

Based on the video information of the monitoring camera 20, the identification unit 12 identifies a non-acquisition area where the video information has not been acquired in the monitoring area. The identification unit 12 can identify a plurality of non-acquisition areas.

The determination unit 13 determines the travel route of the vehicle 30 so that the vehicle travels in the non-acquisition area.

Specifically, the determination unit 13 acquires, from the storage unit 16, a boarding point at which the passenger boards the vehicle 30 and an alighting point at which the passenger alights the vehicle 30. The determination unit 13 determines the travel route of the vehicle 30 based on the boarding point and the alighting point of the passenger. More specifically, the determination unit 13 determines the travel route of the vehicle 30 so that the vehicle 30 travels in the non-acquisition area while the vehicle 30 arrives at the alighting point from the boarding point of the passenger. The determination unit 13 determines the travel route of the vehicle 30 so that the vehicle 30 travels in the non-acquisition area before the vehicle 30 arrives at the boarding point of the passenger. The determination unit 13 determines the travel route of the vehicle 30 so that the vehicle 30 travels in the non-acquisition area after the vehicle 30 arrives at the alighting point of the passenger. Here, the determination unit 13 may determine the travel route of the vehicle 30 so that the vehicle 30 travels in a plurality of non-acquisition areas.

The determination unit 13 acquires the boarding reservation time and the alighting schedule time of the vehicle 30 of the passenger from the storage unit 16 in addition to the boarding point and the alighting point of the passenger. The determination unit 13 may determine the travel route of the vehicle 30 based on the boarding point and the alighting point of the passenger, the boarding reservation time, and the alighting schedule time. That is, the determination unit 13 determines the travel route of the vehicle 30 so that the vehicle 30 is not late for the boarding reservation time or the alighting schedule time, for example, in consideration of the boarding reservation time and the alighting schedule time of the passenger.

The determination unit 13 may determine the travel route of the vehicle 30 so that the vehicle 30 travels in the non-acquisition area in a predetermined period of time. For example, when a purpose is to use video information of a monitoring area for crowd behavior analysis, the video information for a period of time in which congestion is expected is necessary for analysis. In this case, the predetermined period of time is a period of time in which congestion is expected in the non-acquisition area. For example, the period of time in which congestion is expected is a period of time of a morning or evening commuting rush. When an event is held in a nearby facility, the period of time in which congestion is expected includes a period of time from several hours before the event is held to several hours after the event ends.

The determination unit 13 may determine the travel route for each of the plurality of vehicles 30 so that the vehicle 30 travels in the non-acquisition area in consideration of the boarding point and the alighting point of the passenger for each of the plurality of vehicles 30. At this time, for example, the determination unit 13 determines the travel route for each of the plurality of vehicles 30 so that the vehicle 30 travels in the same non-acquisition area in different period of times. Furthermore, the determination unit 13 may determine the travel route for each of the plurality of vehicles 30 so that the vehicle 30 travels in the non-acquisition area in consideration of the boarding point and the alighting point of the passenger for each of the plurality of vehicles 30, and the boarding reservation time and the alighting schedule time of the passenger. For example, the determination unit 13 determines an optimum travel route for each of the plurality of vehicles 30, for example, by causing another vehicle 30 to travel in the non-acquisition area when the predetermined vehicle 30 is caused to travel in the non-acquisition area and when the vehicle 30 is likely to be late for the boarding reservation time and the alighting schedule time.

The vehicle travel unit 14 causes the vehicle 30 to travel based on the determined travel route.

The non-acquisition area video acquisition unit 15 acquires video information of the non-acquisition area from the vehicle camera 31 mounted on the vehicle 30. Then, the non-acquisition area video acquisition unit 15 stores the video information of the non-acquisition area in the storage unit 16.

The storage unit 16 stores the video information of the monitoring area, information regarding a boarding point and an alighting point of each passenger, a boarding reservation time and an alighting schedule time of each passenger, and video information of the non-acquisition area. The information regarding the boarding point and the alighting point of each passenger and the boarding reservation time of each passenger are stored through an operation of an application, a telephone, or the like of a terminal of the passenger. The alighting schedule time is determined by the travel route determination apparatus 10 within a range that satisfies a service level for a passenger of the vehicle 30.

Figure 3:
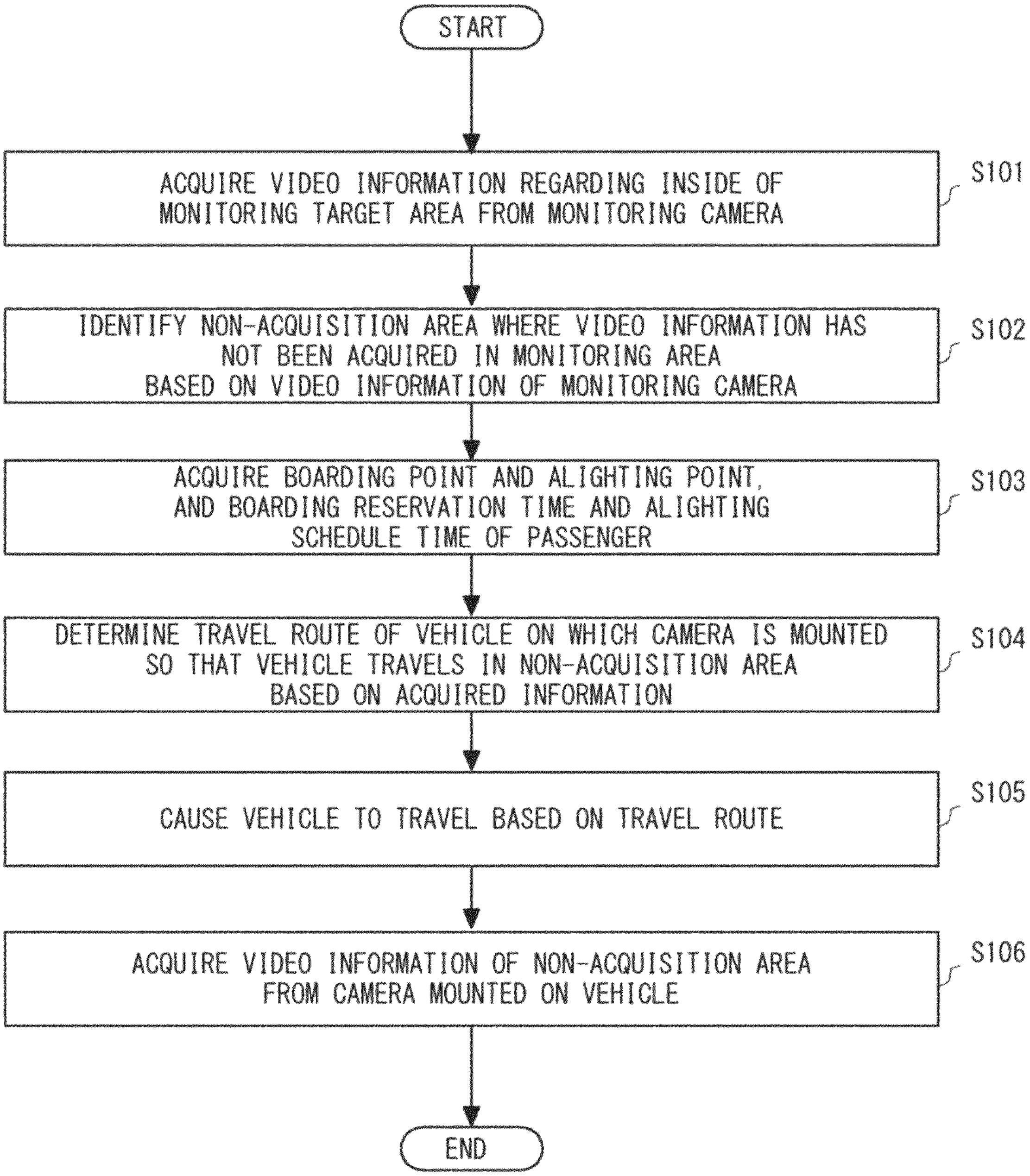
FIG. 3 is a flowchart illustrating an operation of a travel route determination apparatus according to the second example embodiment.

Next, an operation of the travel route determination apparatus 10 according to the second example embodiment will be described with reference to FIG. 3.

First, in step S101, the monitoring area video acquisition unit 11 of the travel route determination apparatus 10 acquires video information regarding the inside of the monitoring area from the monitoring camera 20. Then, the monitoring area video acquisition unit 11 stores the video information in the monitoring area in the storage unit 16.

Subsequently, in step S102, the identification unit 12 identifies a non-acquisition area where the video information has not been acquired in the monitoring area based on the video information of the monitoring camera 20.

Subsequently, in step S103, the determination unit 13 acquires information regarding the boarding point and the alighting point of the passenger of the vehicle 30, and the boarding reservation time and the alighting schedule time of the passenger from the storage unit 16.

Subsequently, in step S104, the determination unit 13 determines the travel route of the vehicle 30 so that the vehicle 30 travels in the non-acquisition area based on the acquired information (information regarding the boarding point and the alighting point of the passenger and the boarding reservation time and the alighting schedule time of the passenger).

Specifically, the determination unit 13 detects the non-acquisition area at a predetermined distance from the boarding point and the alighting point of the passenger, and determines the travel route so that the vehicle 30 passes through the non-acquisition area. In addition, the travel route is determined in consideration of the boarding reservation time and the alighting schedule time of the passenger. For example, as illustrated in FIGS. 4 and 5, the determination unit 13 determines the travel route so that the vehicle 30 travels in the non-acquisition area.

Figure 4:
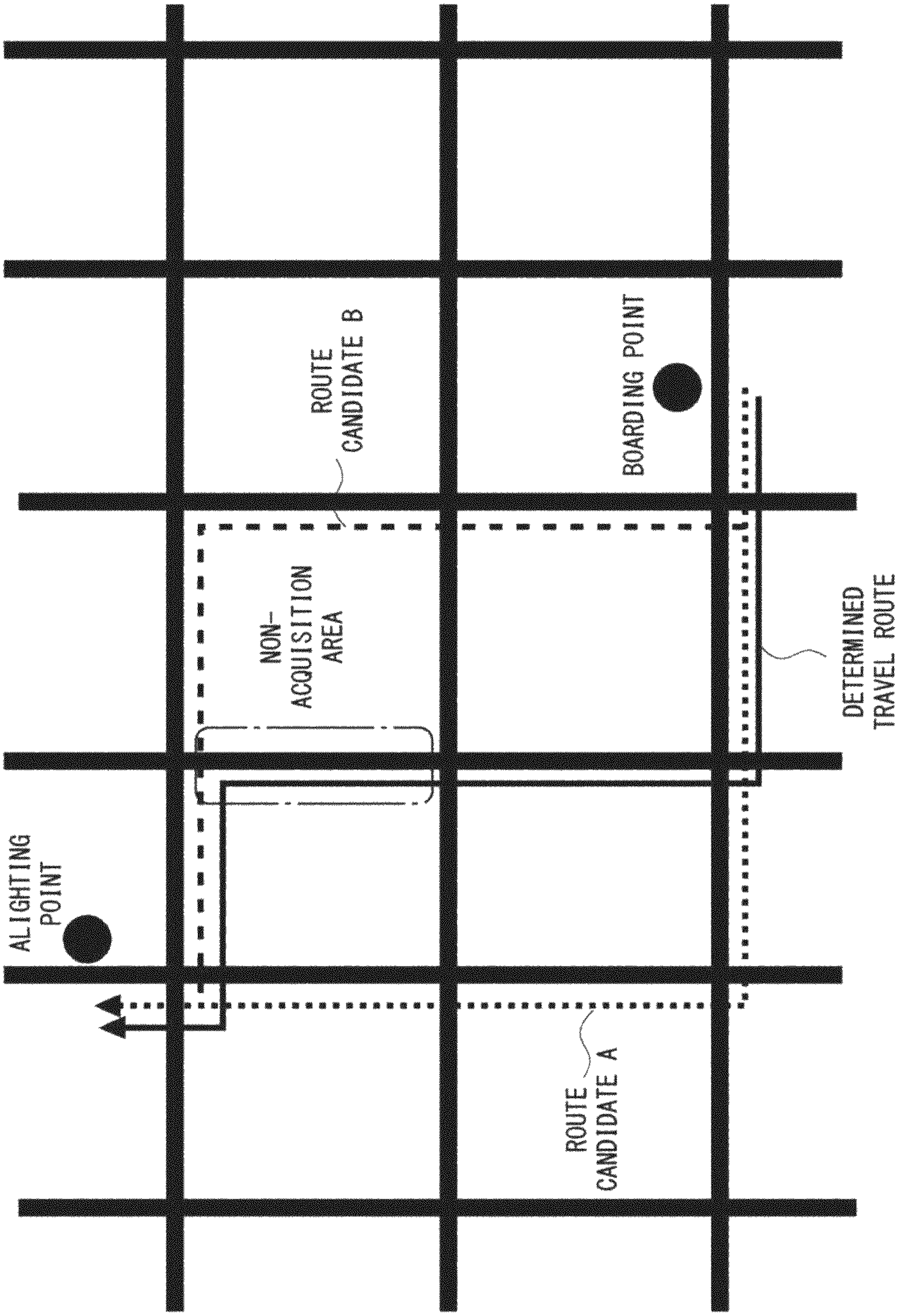
FIG. 4 is a diagram illustrating an example in which a travel route of a vehicle is determined so that the vehicle travels in a non-acquisition area while the vehicle arrives at an alighting point from a boarding point of a passenger in a travel route determination apparatus according to the second example embodiment.

FIG. 4 illustrates an example in which the travel route of the vehicle 30 is determined so that the vehicle 30 travels in the non-acquisition area while the vehicle 30 arrives at the alighting point from the boarding point of the passenger in the determination unit 13. As illustrated in FIG. 4, the determination unit 13 can extract route candidates A and B as candidates for the travel route along which the vehicle 30 travels from a boarding point to an alighting point. However, the determination unit 13 determines, as the travel route of the vehicle 30, a travel route along which the vehicle 30 travels in the non-acquisition area, instead of route candidates A and B along which the vehicle 30 does not travel in the non-acquisition area.

Figure 5:
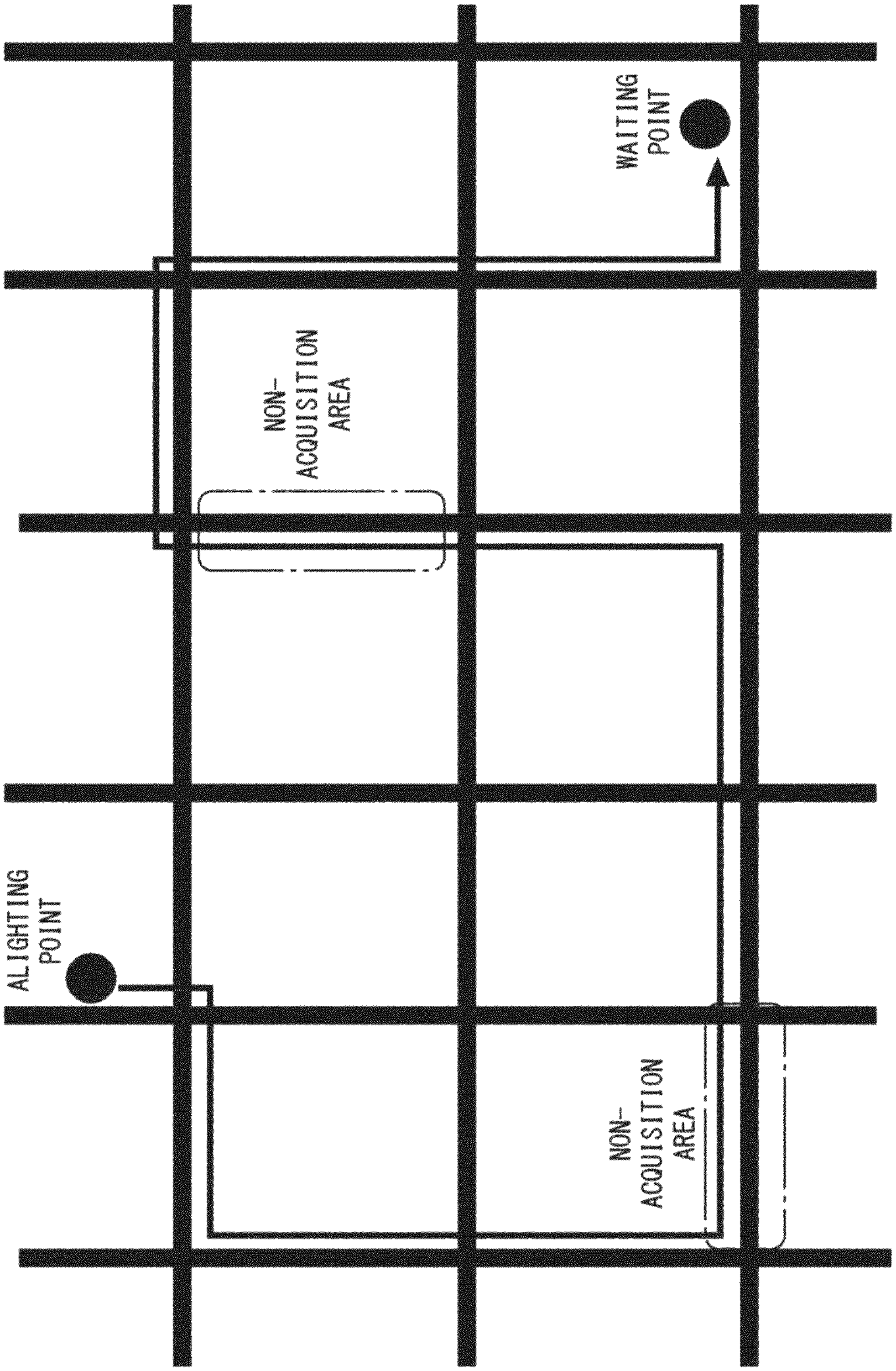
FIG. 5 is a diagram illustrating an example in which a travel route of a vehicle is determined so that the vehicle travels in a non-acquisition area after the vehicle arrives at an alighting point of a passenger in the travel route determination apparatus according to the second example embodiment.

FIG. 5 illustrates an example in which a travel route of vehicle 30 is determined so that the vehicle 30 travels in the non-acquisition area after the vehicle 30 arrives at the alighting point of the passenger in the determination unit 13. As illustrated in FIG. 5, the determination unit 13 determines the travel route so that the vehicle 30 travels in the non-acquisition area from the alighting point of the passenger to a waiting point based on information regarding the alighting point of the passenger and the waiting point of the vehicle 30. When there are a plurality of non-acquisition areas, the determination unit 13 determines the travel route of vehicle 30 so as to travel in the plurality of non-acquisition areas.

In the above description, the example in which the determination unit 13 determines the travel route of the vehicle 30 so that the vehicle 30 travels in the non-acquisition area while the vehicle 30 arrives at the alighting point from the boarding point of the passenger or after the vehicle 30 arrives at the alighting point of the passenger has been described. As another example, the determination unit 13 may determine the travel route so that the vehicle 30 travels in the non-acquisition area before the vehicle 30 arrives at the boarding point of the passenger.

In the above description, the example in which the determination unit 13 determines the travel route of the vehicle 30 so that the vehicle 30 travels in the non-acquisition area based on information regarding the boarding point and the alighting point of the passenger, and the boarding reservation time and the alighting schedule time of the passenger has been described. As another example, the determination unit 13 may determine the travel route of vehicle 30 so that the vehicle 30 travels in the non-acquisition area without considering the boarding reservation time and the alighting schedule time of the passenger. In this case, the determination unit 13 determines the travel route of vehicle 30 based on the boarding point and the alighting point of the passenger.

The determination unit 13 may determine the travel route so that the vehicle 30 travels in the non-acquisition area for a predetermined period of time. For example, when a purpose is to use video information of a monitoring area for crowd behavior analysis, the video information for a period of time in which congestion is expected is necessary for analysis. In this case, the predetermined period of time is a period of time in which congestion is expected in the non-acquisition area. For example, the period of time in which congestion is expected is a period of time of a morning or evening commuting rush. When an event is held in a nearby facility, the period of time in which congestion is expected includes a period of time from several hours before the event is held to several hours after the event ends.

The determination unit 13 may determine the travel route of the vehicle 30 so that the vehicle 30 travels in the non-acquisition area for the predetermined period of time, and determine the travel route of the vehicle 30 that does not travel in the non-acquisition area for a period of time other than the predetermined period of time.

Subsequently, in step S105, the vehicle travel unit 14 causes the vehicle 30 to travel based on the travel route.

Subsequently, in step S106, the non-acquisition area video acquisition unit acquires the video information of the non-acquisition area from the vehicle camera 31 mounted on the vehicle 30.

As described above, the travel route determination apparatus 10 according to the second example embodiment determines the travel route of the vehicle 30 on which the vehicle camera 31 is mounted so that the vehicle 30 travels in the non-acquisition area in the monitoring area. Accordingly, the travel route determination apparatus 10 can acquire a video of the non-acquisition area in the monitoring area, for example, where no monitoring camera is installed. Therefore, the travel route determination apparatus 10 can analyze congestion, a population flow, and the like as the crowd behavior analysis even in the non-acquisition area, for example.

The travel route determination apparatus 10 determines the travel route of the vehicle 30 so that the vehicle travels in the non-acquisition area based on the boarding point and the alighting point of the passenger stored in advance. Accordingly, the travel route determination apparatus 10 causes the vehicle 30 to travel along the predetermined travel route, and thus it is possible to prevent a decrease in the satisfaction level of the passenger of the vehicle since no sudden change occurs in the travel route of the vehicle 30.

The travel route determination apparatus 10 determines the travel route of the vehicle so that the vehicle travels in the non-acquisition area in consideration of the boarding point and the alighting point of the passenger, and the boarding reservation time and the alighting schedule time of the passenger. Accordingly, the video of the non-acquisition area can be acquired in parallel with an operation of the vehicle 30 without disturbing a normal operation of the vehicle 30.

The travel route determination apparatus 10 determines the travel route so that the vehicle 30 travels in the non-acquisition area for a predetermined period of time. The travel route of the vehicle 30 can be determined only for a period of time in which the video of the non-acquisition area is required, such as a period of time in which congestion is expected.

The present invention is not limited to the above example embodiments, and can be appropriately changed without departing from the gist.

For example, the determination unit 13 of the travel route determination apparatus 10 may determine the travel route for each of the plurality of vehicles 30 so that the vehicle 30 travels in the non-acquisition area in consideration of the boarding point and the alighting point of the passenger for each of the plurality of vehicles 30. At this time, for example, the determination unit 13 determines the travel route for each of the plurality of vehicles 30 so that the vehicle 30 travels in the same non-acquisition area in different period of times. Furthermore, the determination unit 13 may determine the travel route for each of the plurality of vehicles 30 so that the vehicle 30 travels in the non-acquisition area in consideration of the boarding point and the alighting point of the passenger for each of the plurality of vehicles 30, and the boarding reservation time and the alighting schedule time of the passenger. The determination unit 13 determines an optimum travel route for each of the plurality of vehicles 30, for example, by causing another vehicle 30 to travel in the non-acquisition area, for example, when the predetermined vehicle 30 is caused to travel in the non-acquisition area and when the vehicle 30 is likely to be late for a boarding schedule time and the alighting schedule time.

In the above-described example embodiment, an object is to use the video information in the monitoring area including the non-acquisition area for the crowd behavior analysis. As another example, the video information may be used for confirming a disaster or monitoring a town other than a case where the video information is intended to be used for the crowd behavior analysis.

In the above example embodiment, the case where the vehicle 30 is an on-demand bus that can automatically travel has been described as an example. The vehicle 30 may be a manned on-demand bus that can be driven by a person.

<Example of Hardware Configuration>

Each functional constituent element of the travel route determination apparatus 10 according to the first and second example embodiments may be implemented by hardware (for example, a hard-wired electronic circuit or the like) that implements each functional constituent element, or may be implemented by combining hardware and software (for example, by combining an electronic circuit and a program that controls the electronic circuit or the like). Hereinafter, a case where each functional constituent unit of the above apparatus is realized by combining hardware and software will be further described.

Figure 6:
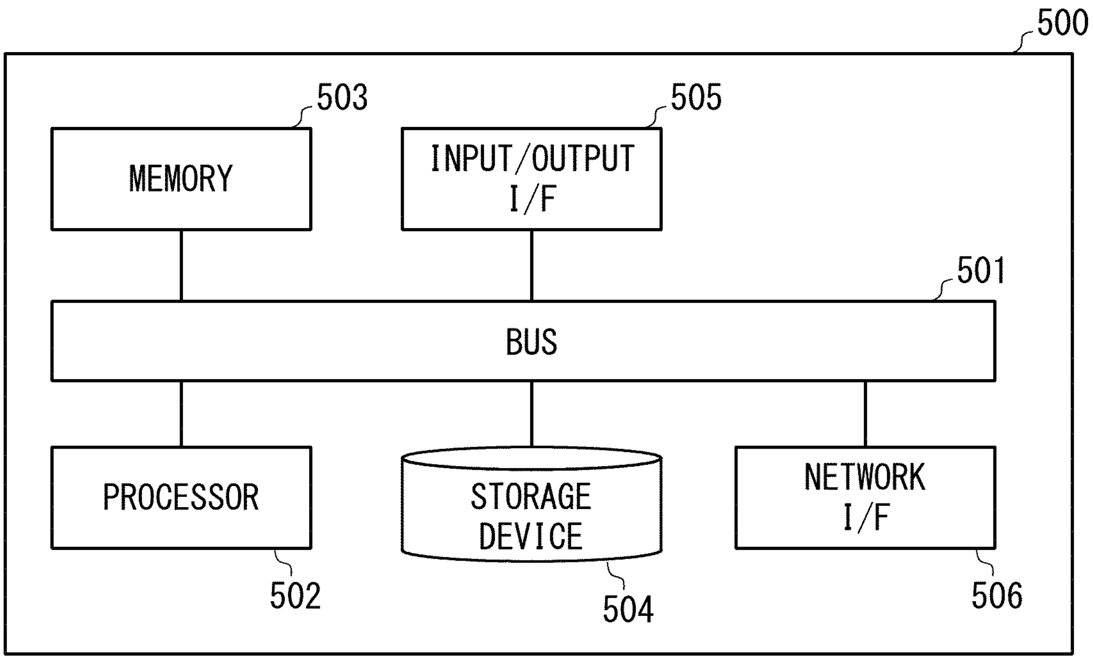
FIG. 6 is a block diagram illustrating an example of a hardware configuration of a computer according to the first and second example embodiments.

FIG. 6 is a block diagram illustrating an example of a hardware configuration of a computer 500. The travel route determination apparatus 10 can be implemented by the computer 500. The computer 500 may be a portable computer such as a smartphone or a tablet terminal or may be a stationary computer such as a PC. The computer 500 may be a dedicated computer or a general-purpose computer.

For example, by installing a predetermined application on the computer 500, the computer 500 can have a desired function. For example, by installing an application that implements each function of the travel route determination apparatus 10 in the computer 500, each function of the travel route determination apparatus 10 is implemented in the computer 500.

The computer 500 includes a bus 501, a processor 502, a memory 503, a storage device 504, an input/output interface (I/F) 505, and a network interface (I/F) 506. The bus 501 is a data transmission path along which the processor 502, the memory 503, the storage device 504, the input/output interface 505, and the network interface 506 transmit and receive data to and from each other. However, a method of connecting the processor 502 and the like to each other is not limited to connection by the bus.

The processor 502 is any of various processors such as a central processing unit (CPU), a graphics processing unit (GPU), or a field-programmable gate array (FPGA). The memory 503 is a main storage device realized by using a random access memory (RAM) or the like. The storage device 504 is an auxiliary storage device realized by using a hard disk, a solid state drive (SSD), a memory card, a read only memory (ROM), or the like.

The input/output interface 505 is an interface connecting the computer 500 to an input/output device. For example, an input device such as a keyboard and an output device such as a display device are connected to the input/output interface 505.

The network interface 506 is an interface connecting the computer 500 to a network. The network may be a local area network (LAN) or a wide area network (WAN).

The storage device 504 stores a program that realizes a desired function. For example, the storage device 504 included in the computer 500 stores a program (a program of the above-described application) implementing the function of the travel route determination apparatus 10. The processor 502 reads the program into the memory 503 and executes the program to realize each function.

The programs include a command group (or software codes) causing the computer to perform one or more functions that have been described in the example embodiments when the program is read by the computer. The program may be stored in a non-transitory computer-readable medium or a tangible storage medium. As an example and not by way of limitation, the computer-readable medium or the tangible storage medium includes a random-access memory (RAM), a read-only memory (ROM), a flash memory, a solid-state drive (SSD) or any other memory technique, a CD-ROM, a digital versatile disc (DVD), a Blu-ray (registered trademark) disc or any other optical disk storage, a magnetic cassette, a magnetic tape, a magnetic disk storage, and any other magnetic storage devices. The program may be transmitted on a transitory computer-readable medium or a communication medium. As an example and not by way of limitation, transitory computer-readable or communication media include electrical, optical, acoustic, or other forms of propagated signals.

REFERENCE SIGNS LIST

- 10 TRAVEL ROUTE DETERMINATION APPARATUS
- 11 MONITORING AREA VIDEO ACQUISITION UNIT
- 12 IDENTIFICATION UNIT
- 13 DETERMINATION UNIT
- 14 VEHICLE TRAVEL UNIT
- 15 NON-ACQUISITION AREA VIDEO ACQUISITION UNIT
- 16 STORAGE UNIT
- 20 MONITORING CAMERA
- 30 VEHICLE
- 31 VEHICLE CAMERA
- 500 COMPUTER
- 501 BUS
- 502 PROCESSOR
- 503 MEMORY
- 504 STORAGE DEVICE
- 505 INPUT/OUTPUT INTERFACE (I/F)
- 506 NETWORK INTERFACE (I/F)

What is claimed is:

1. A travel route determination apparatus comprising:

at least one memory storing instructions, and at least one processor configured to execute the instructions to:

acquire video information of a monitoring area;

identify a non-acquisition area where the video information has not been acquired in the monitoring area;

determine a travel route of a vehicle on which a camera is mounted, so that the vehicle travels in the non-acquisition area, based on a boarding point where a passenger boards the vehicle and an alighting point where the passenger alights the vehicle; and control the vehicle to travel along the travel route, wherein the at least one processor is further configured to execute the instructions to determine the travel route of the vehicle based on a boarding reservation time and an alighting schedule time of the passenger, and wherein the at least one processor is further configured to execute the instructions to determine the travel route so that the vehicle travels in the non-acquisition area in a predetermined period of time.

2. The travel route determination apparatus according to claim 1, wherein the predetermined period of time is a period of time in which congestion is expected in the non-acquisition area.

3. The travel route determination apparatus according to claim 1, wherein the at least one processor is further configured to execute the instructions to determine a travel route for each of a plurality of vehicles so that the vehicle travels in the non-acquisition area in consideration of a boarding point and an alighting point of a passenger of each of the plurality of vehicles.

4. The travel route determination apparatus according to claim 1, wherein the at least one processor is further configured to execute the instructions to determine the travel route of the vehicle so that the vehicle travels in the non-acquisition area while the vehicle arrives at the alighting point from the boarding point of the passenger.

5. The travel route determination apparatus according to claim 1, wherein the at least one processor is further configured to execute the instructions to determine the travel route of the vehicle so that the vehicle travels in the non-acquisition area before the vehicle arrives at the boarding point of the passenger.

6. The travel route determination apparatus according to claim 1, wherein the at least one processor is further configured to execute the instructions to determine the travel route of the vehicle so that the vehicle travels in the non-acquisition area after the vehicle arrives at the alighting point of the passenger.

7. A travel route determination method comprising:

acquiring, by a computer, video information of a monitoring area;

identifying, by the computer, a non-acquisition area where the video information has not been acquired in the monitoring area;

determining, by the computer, a travel route of a vehicle on which a camera is mounted so that the vehicle travels in the non-acquisition area; and controlling, by the computer, the vehicle to travel along the travel route, wherein the determination of the travel route of the vehicle includes determining the travel route of the vehicle based on a boarding point where a passenger boards the vehicle, an alighting point where the passenger alights the vehicle, a boarding reservation time, and an alighting schedule time of the passenger, and wherein the determination of the travel route of the vehicle includes determining the travel route so that the vehicle travels in the non-acquisition area in a predetermined period of time.

8. A non-transitory computer-readable medium that stores a program thereon which, upon execution by a computer, causes the computer to perform steps comprising:

acquiring video information of a monitoring area;

identifying a non-acquisition area where the video information has not been acquired in the monitoring area;

determining a travel route of a vehicle on which a camera is mounted so that the vehicle travels in the non-acquisition area; and controlling the vehicle to travel along the travel route, wherein the determination of the travel route of the vehicle includes determining the travel route of the vehicle based on a boarding point where a passenger boards the vehicle, an alighting point where the passenger alights the vehicle, a boarding reservation time, and an alighting schedule time of the passenger, and wherein the determination of the travel route of the vehicle includes determining the travel route so that the vehicle travels in the non-acquisition area in a predetermined period of time.

9. A travel route determination apparatus comprising:

at least one memory storing instructions, and at least one processor configured to execute the instructions to:

acquire video information of a monitoring area;

identify a non-acquisition area where the video information has not been acquired in the monitoring area;

determine a travel route of a vehicle on which a camera is mounted, so that the vehicle travels in the non-acquisition area, based on a boarding point where a passenger boards the vehicle and an alighting point where the passenger alights the vehicle; and control the vehicle to travel along the travel route, wherein the at least one processor is further configured to execute the instructions to determine a travel route for each of a plurality of vehicles so that the vehicle travels in the non-acquisition area in consideration of a boarding point and an alighting point of a passenger of each of the plurality of vehicles.

10. A travel route determination method comprising:

acquiring, by a computer, video information of a monitoring area;

identifying, by the computer, a non-acquisition area where the video information has not been acquired in the monitoring area;

determining, by the computer, a travel route of a vehicle on which a camera is mounted so that the vehicle travels in the non-acquisition area; and controlling, by the computer, the vehicle to travel along the travel route, wherein the determination of the travel route of the vehicle includes determining the travel route of the vehicle based on a boarding point where a passenger boards the vehicle and an alighting point where the passenger alights the vehicle, and wherein the determination of the travel route of the vehicle includes determining a travel route for each of a plurality of vehicles so that the vehicle travels in the non-acquisition area in consideration of a boarding point and an alighting point of a passenger of each of the plurality of vehicles.

11. A non-transitory computer-readable medium that stores a program thereon which, upon execution by a computer, causes the computer to perform steps comprising:

acquiring video information of a monitoring area;

identifying a non-acquisition area where the video information has not been acquired in the monitoring area;

determining a travel route of a vehicle on which a camera is mounted so that the vehicle travels in the non-acquisition area; and controlling the vehicle to travel along the travel route, wherein the determination of the travel route of the vehicle includes determining the travel route of the vehicle based on a boarding point where a passenger boards the vehicle and an alighting point where the passenger alights the vehicle, and wherein the determination of the travel route of the vehicle includes determining a travel route for each of a plurality of vehicles so that the vehicle travels in the non-acquisition area in consideration of a boarding point and an alighting point of a passenger of each of the plurality of vehicles.

* * * * *